United States Patent [19]

Gandhi et al.

[11] Patent Number: 4,782,260

[45] Date of Patent: Nov. 1, 1988

[54] CLOSED SLOT ROTOR CONSTRUCTION

[75] Inventors: Deepakkumar J. Gandhi; Thomas W. Neumann, both of Fort Wayne, Ind.

[73] Assignee: General Electric Company, Fort Wayne, Ind.

[21] Appl. No.: 20,299

[22] Filed: Feb. 27, 1987

[51] Int. Cl.⁴ ............................................. H02K 1/00
[52] U.S. Cl. ..................................... 310/216; 310/42; 310/261
[58] Field of Search ............... 310/179, 216, 217, 211, 310/212, 42, 254, 261, 262, 264, 265, 267; 29/598

[56] References Cited

U.S. PATENT DOCUMENTS

| | | | |
|---|---|---|---|
| 1,695,946 | 12/1928 | Bergman | 310/212 |
| 1,695,947 | 12/1928 | Bergman | 29/598 |
| 2,794,138 | 5/1957 | Dunn, Jr. | 310/211 |
| 3,401,280 | 9/1968 | Lackey et al. | 310/42 |
| 4,301,386 | 11/1981 | Schweder et al. | 310/59 |
| 4,499,660 | 2/1985 | Lenz | 29/598 |

*Primary Examiner*—R. Skudy
*Attorney, Agent, or Firm*—Ralph E. Krisher, Jr.

[57] ABSTRACT

A rotor lamination for use in a dynamo-electric machine of the kind having a stacked laminated rotor, is formed of a flat circular plate of ferromagnetic material having a number of equally circumferentially spaced closed slots. Each of the slots is substantially V shaped at an upper slot region near the circumference of the plate, and is symmetrical about a radial center line. Each leg of the V forms an angle of about 30 degrees with respect to a line drawn perpendicular to the radial center line of the slot.

20 Claims, 3 Drawing Sheets

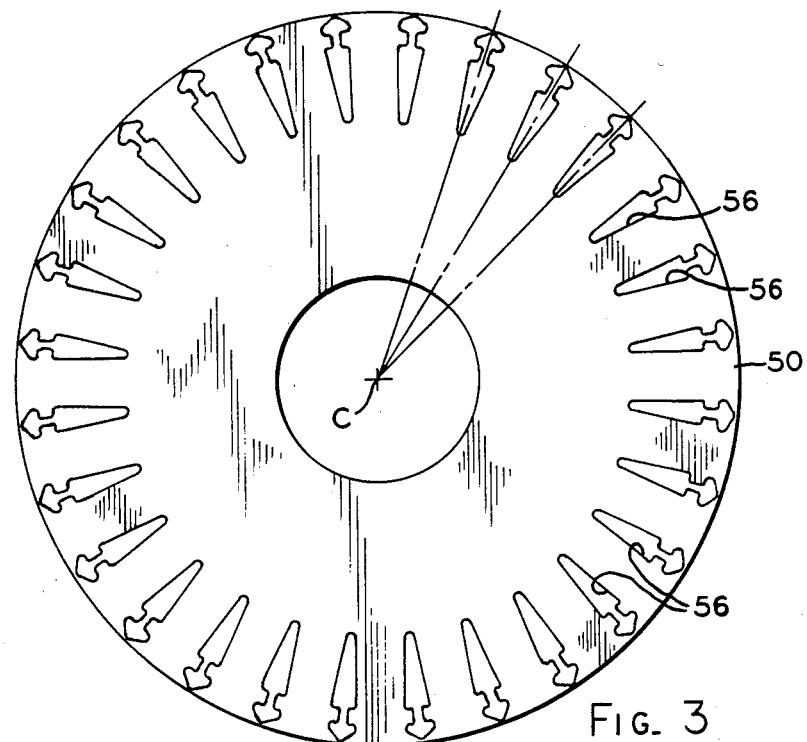
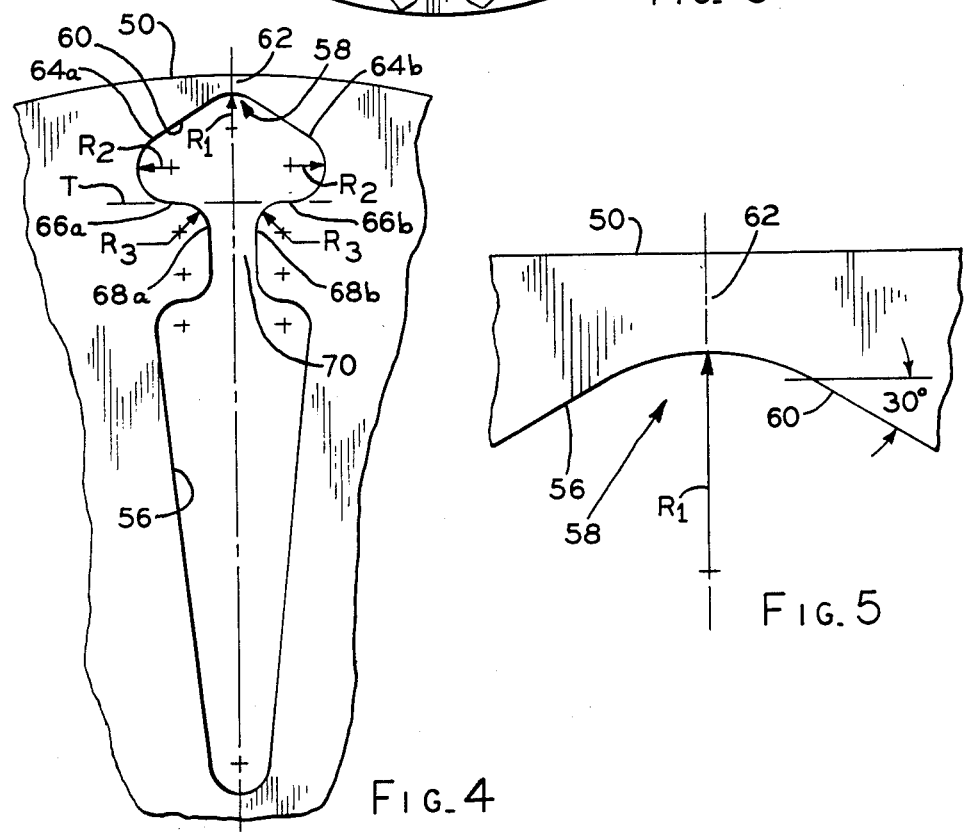

CLOSED SLOT ROTOR CONSTRUCTION

RELATIONSHIP TO OTHER APPLICATIONS

This application is being filed on the same day as commonly assigned applications BASE ASSEMBLY FOR DYNAMO-ELECTRIC MACHINE in the name of Robert L. Sieber, Ser. No. 19,823; DYNAMO-ELECTRIC MACHINE LAMINATION CONSTRUCTION in the name of Thomas W. Neumann, Ser. No. 20,297; and LIP STRUCTURE FOR A STATOR IN A DYNAMO-ELECTRIC MACHINE in the names of Deepakkumar J. Gandhi et al., Ser. No. 19,811.

BACKGROUND OF THE INVENTION

1. Field of the Invention

The present invention relates generally to closed slot rotor laminations or punchings for use in dynamo-electric machines, and more particularly to a lamination in which the slots are formed with generally V-shaped top ends.

2. Description of the Known Art

Rotors formed of a stack of laminations having closed slots equally spaced from one another about the periphery of each lamination are known from, for example, U.S. Pat. Nos. 2,794,138 (May 28, 1957) and 3,401,280 (Sept. 10, 1968), both having been assigned to the assignee of the present invention.

Such rotors are ordinarily used in inductive AC motors, wherein conducting members which extend axially along the rotor through aligned slots of the stacked laminations interact with a rotating magnetic field created in an air gap between the outer circumference of the rotor and the inner circumference of the machine stator. Windings embedded in slots between radially inwardly projecting teeth of the stator, adjacent the air gap, are connected to the AC mains, and the stator winding conductors pass through a certain order of the stator slots so as to cause magnetic flux in the air gap to rotate in synchronism with the frequency of the AC mains.

To obtain high efficiency during normal rotational speed conditions for the rotor, the conductive members or bars in the rotor slots should have minimal resistance. Low rotor resistance, however, results in low starting torque with a high starting current and a low starting power factor. One way to achieve an effectively high rotor resistance at motor start-up, is to employ a so-called double squirrel cage rotor bar arrangement in which two parallel conductive bars pass through each rotor slot with top bars (i.e., the bars closer to the rotor circumference) having smaller cross-sectional area and, hence, higher resistance, than bottom bars set deeper in the slots, i.e. closer to the axis of the rotor. The top bars and the bottom bars are all shorted together at the axial ends of the rotor.

By constricting the rotor slots between the top and the bottom bars in the radial direction to form a so-called neck portion of the slot, the bottom bars will have a much greater inductance in relation to the top bars and, thus, relatively little current is induced in the bottom bars at motor start-up when the air gap flux rotates at greatest speed relative to the rotor bars. The effective rotor resistance at start-up is then about equal to that of the top bars and, thus, sufficient start-up torque may be obtained. When the rotor approaches normal running speed, however, the air gap field interacts with the rotor bars at a much lower frequency so that the inductance of the bottom bars becomes less significant. The lower resistance of the bottom bars then provides greater operating frequency, the actual rotor resistance approximating that of both the bottom and top bars in parallel.

Closed slot rotors of the double cage variety conventionally have the slots in the rotor laminations formed with a generally V shaped edge at the top of the slot with the center of the V creating a narrow bridge part between the top of the slot and the outer circumference of the lamination. Further, the angle defined between each leg of the V and a line drawn perpendicular to the radial center line of the slot conventionally has been between about 40 to 45 degrees. Such angles as 40 degrees and 45 degrees for the V shaped edge and would require a narrower bridge in order to deliver the same performance, and would therefore present difficulties in machining of the closed slots at the peripheries of the rotor laminations.

SUMMARY OF THE INVENTION

An object of the invention is to provide a closed slot rotor lamination which can be manufactured without imposing costly production procedures.

Another object of the invention is to provide a closed slot rotor lamination having a V-shaped top wherein the angle of the V allows for optimum electromagnetic performance.

A further object of the invention is to provide a closed slot rotor lamination in which neck portions of the slots are located to optimize machine performance.

According to the invention, a lamination used to form a rotor in a dynamo-electric machine, includes a flat circular plate of ferromagnetic material having a number of equally circumferentially spaced closed slots extending radially near the outer periphery of the plate. As will be understood by persons skilled in the art, the slots are formed to contain conducting members which extend along the rotor when a number of the plates (also called punchings or laminations) are stacked together and corresponding slots are placed in communication with one another. Each slot is substantially V-shaped at an upper slot region and symmetrical about a radial center line. The legs of the V diverge from one another towards the center of the plate, and each leg of the V forms an angle of about 30 degrees with respect to a line drawn perpendicular to the radial center line of the slot.

The various features of novelty which characterize the invention are pointed out with particularity in the claims annexed to and forming a part of the present disclosure. For a better understanding of the invention, its operating advantages and specific objects attained by its use, reference should be had to the accompanying drawing and descriptive matter in which there are illustrated and described preferred embodiments of the invention.

BRIEF DESCRIPTION OF THE DRAWING

In the drawing:

FIG. 3 is a plan view of a rotor lamination according to one embodiment of the present invention;

FIG. 4 is an enlarged view of a closed slot in the lamination of FIG. 3;

FIG. 5 is an enlarged view of an upper slot region of the slot in FIG. 4;

DETAILED DESCRIPTION OF THE INVENTION

Figure 1:
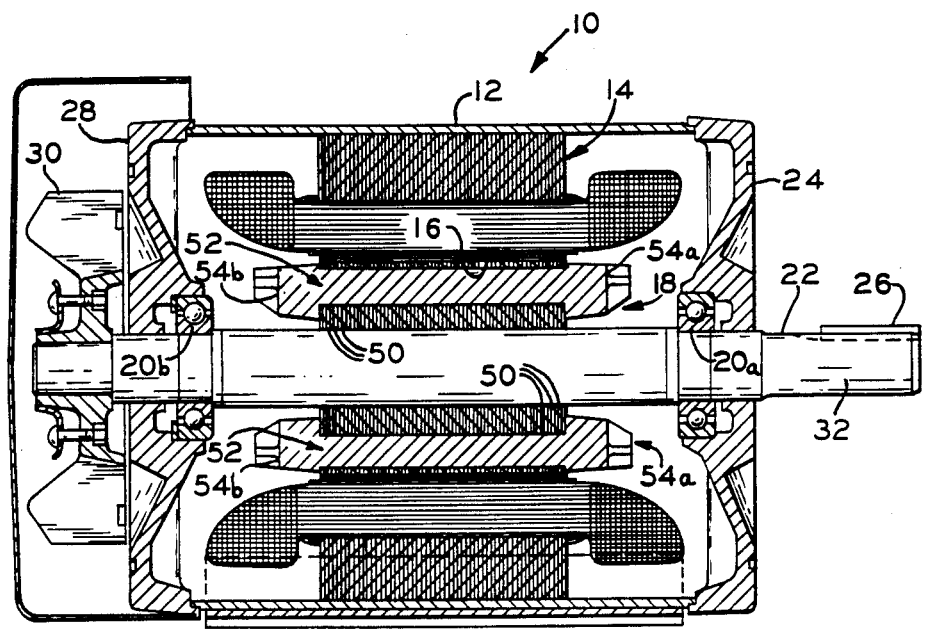
FIG. 1 is a side view, partly in section, of a dynamo-electric machine in which the present invention may be embodied.
Figure 2:
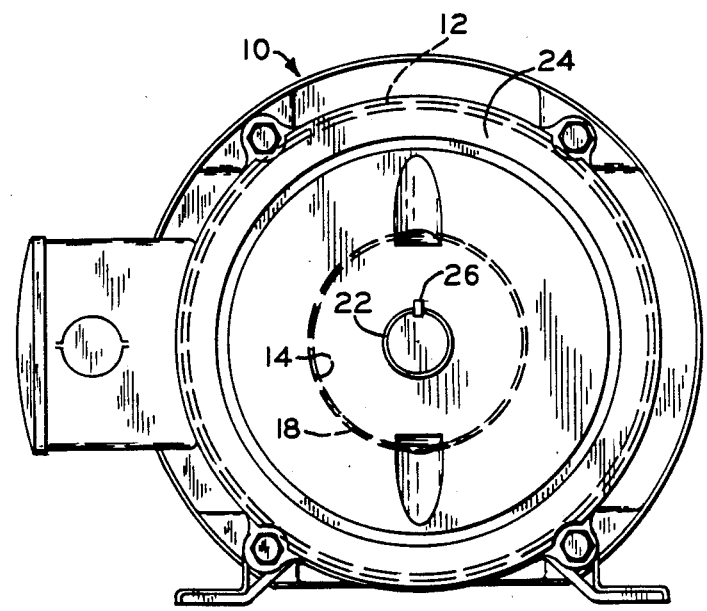
FIG. 2 is a front end view of the machine in FIG. 1.

FIG. 1 shows a side view, in section, of a dynamo electric machine 10, in which the present invention may be embodied. A front view of the machine 10 is shown in FIG. 2.

Basically, the machine 10 includes a generally cylindrical outer casing 12, and a generally cylindrical stator 14 fixed coaxially within the outer casing 12 and having a coaxial stator bore 16. A rotor 18 is supported by suitable bearings 20a, 20b at the front and back of casing 12, to extend axially within the rotor bore 16 and for rotational movement about the bore axis. In the particular example shown a shaft part 22 of the rotor 18 extends axially from a front end shield 24 of the machine 10, and has a key 26 projecting radially outward from a recess cut axially a certain distance from the front of the shaft part 22. Key 26 serves to lock the shaft part 22 into a corresponding key way cut in a load member (not shown) e.g. a fan, to which rotational motive power is to be supplied by the machine 10.

A back end shield 28 (FIG. 1) together with the casing 12 and the front end shield 24 serve to contain and protect the stator 14, rotor 18 and associated conductive windings. In the example shown a machine cooling fan 30 is mounted on a rotor stub part 32 which extends outside the back end shield 28, and directs an air current flow over the casing.

As shown in FIG. 1, the shaft part 22 of the rotor 18 extends axially through the machine casing 12 and has a stack of rotor laminations 50 fixed coaxially on the shaft part 22 intermediate the front and back bearings 20a, 20b. Sets of conductive bars 52 pass through axially extending slots formed in the rotor 18 near the outer periphery of each of the laminations 50. The bars 52 are shorted to one another at the axial ends of the stack of laminations 50 by a set of end rings 54a, 54b.

FIG. 3 is a plan view of one of the rotor laminations 50. The lamination is formed of a flat circular plate of ferromagnetic material. The plate lamination 50 has a number (e.g., 28) of uniformly circumferentially spaced closed slots 56 extending symmetrically about radial center lines in a region near the outer periphery of the lamination 50. Slots 56 are formed to contain conductive bars 52 (FIG. 1) which extend substantially parallel to the axis of the rotor 18 when the laminations 50 are stacked face-to-face with the corresponding slots 56 aligned (i.e., in communication with one another). Each of the slots 56 is substantially V-shaped at an upper slot region 58 as shown in FIGS. 4 and 5. A V-shaped edge 60 forming the upper slot region 58 is symmetrical about the radial center line, with the legs of the V diverging from one another in the direction toward the center of the lamination 50.

In one preferred form, as specifically shown in FIG. 5, each leg of the V defining the edge 60, forms an angle of about 30 degrees with respect to a line drawn perpendicular to the radial center line of the slot 56. Further, the center of the V shaped edge 60 is curved at a first radius $R_1$ between the straight legs of the edge 60. A bridge area 62 is thus formed between the upper slot region 58 and the outer circumference of the lamination 50. Preferably, the radial dimension of a narrowest part of the bridge area 62 at the center of the V-shaped edge 60 is at least 0.25 mm., and may be in the range from about 0.25 mm. to about 0.4 mm.

As seen more clearly in FIG. 4, the edges of each slot 56 constrict toward the radial center line of the slot with opposing edges curved continuously at a second radius $R_2$ between distal ends 64a, 64b of the straight legs of the V-shaped edge 60 to a first set of points 66a, 66b, where the slot edges have a common tangent T which is perpendicular to the radial center line.

From the tangent line T, the opposite edges of the slots are curved continuously at a third radius $R_3$ to constrict toward the center line over an arc of 90 degrees to a second set of points 68a, 68b defining tops of neck portions 70 of the slots 56. The tops of the neck portions 70 of the slots 56 are located at points radially of the laminations 50 such as to optimize electromagnetic performance when the conductive bars 52 are inserted in upper and lower regions of the slot 56 of a lamination stack to form a double cage rotor as in FIG. 1. In some specific cases, the segments of the slot contour that joins or blends the radii $R_2$, $R_3$ may be extremely small, or approach a limit such that such segments are essentially non-measurable in terms of length.

Table 1 below shows preferred values for the first, second, and third radii $R_1$, $R_2$, $R_3$ with the V-shaped edge 60 forming the 30 degree angle represented in FIG. 5.

TABLE 1

| LAMINATION 50 PUNCHED DIAMETER | $R_1$ | $R_2$ | $R_3$ |
|---|---|---|---|
| 95 mm. | .932 mm. | .813 mm. | .7 mm. |
| 122 mm. | .892 mm. | .919 mm. | .76 mm. |
| 122 mm. | .933 mm. | .715 mm. | .76 mm. |
| 150 mm. | .934 mm. | 1.105 mm. | .762 mm. |

Table 2, below, shows preferred locations of the tops of neck portions 70, i.e., the radial distance from the center of the lamination 50 (point C in FIG. 3 or FIG. 6) to a line perpendicular to the radial center line of the slot 56 which line intersects the second set of points 68a, 68b in FIG. 4. As shown, the locations of the tops of the neck portions 70 preferably vary according to the diameter of the lamination 50.

TABLE 2

| LAMINATION 50 DIAMETER | RADIAL DISTANCE TO NECK PORTION 70 TOP |
|---|---|
| 95 mm. | 43.462 mm |
| 122 mm. | 56.9 mm. |
| 150 mm. | 70. mm. |

Figure 6:
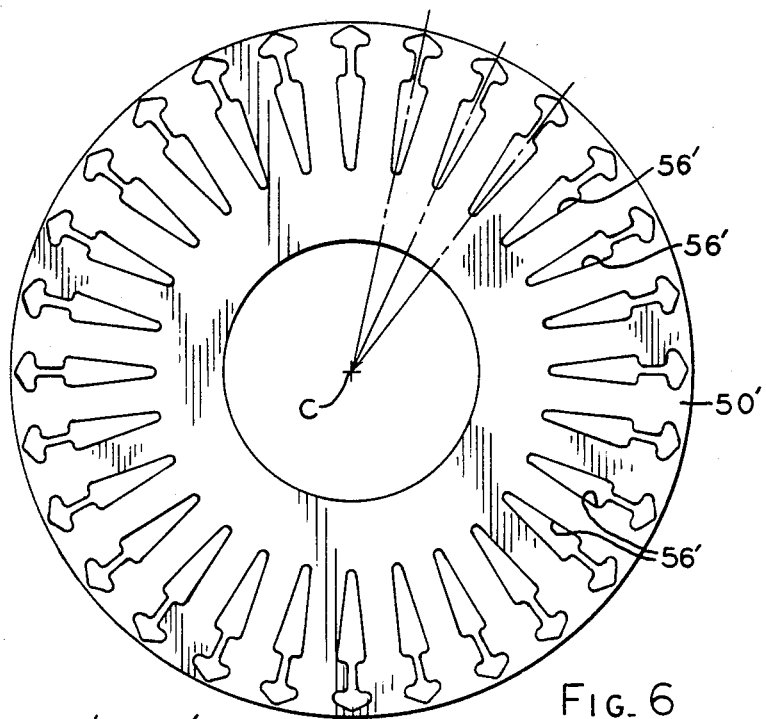
FIG. 6 in a plan view a rotor lamination according to a second embodiment of the invention.
Figure 7:
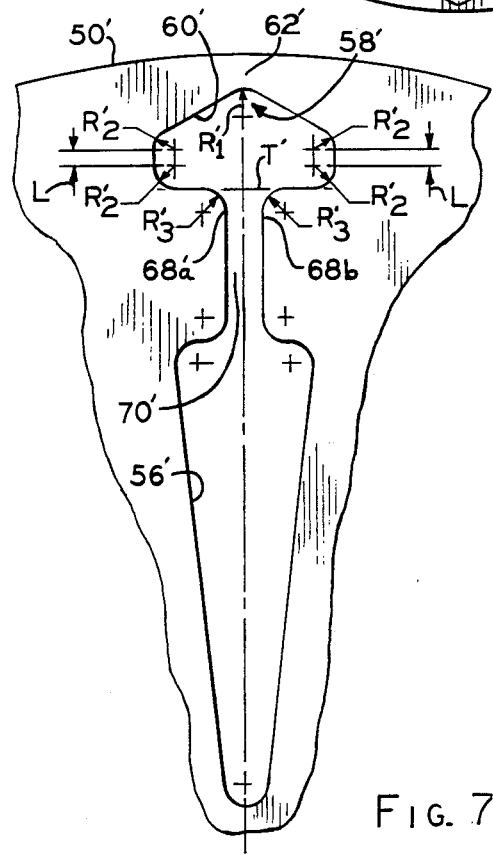
FIG. 7 is an enlarged view of a slot in the lamination of FIG. 6.

FIGS. 6 and 7 shows a closed slot rotor lamination according to a second embodiment of the invention. Parts corresponding to those shown in the embodiment of FIG. 3–5, have corresponding reference characters. As shown in FIG. 7, however, the edge of the slot 56' in the upper region 58' which leads away from the distal ends of the straight legs of the V-shaped edge 60', is only partially curved at a second radius $R_2$, until such edge is parallel to the slot center line and then extends parallel to the center line a certain distance L before curving towards the slot center line at the second radius $R_2$, until becoming tangent to the line T'. For a diameter of 115 mm. for the lamination 50', the distance L is preferably about 0.531 mm. with a first radius $R_1$, of 0.932 mm., and second and third radii $R_2$, $R_3$, all of 0.76 mm. The top of the neck portion 70' is preferably at 52.5 mm. from the center of the circular lamination 50'.

Machines constructed with double cage rotors comprised of laminations according to the present invention exhibited superior performance over rotors having slots with V-shaped edges defining angles of about 45 degrees with respect to breakdown torque, locked rotor torque, full load speed and full load efficiency. Providing the 30 degree angle according to the invention allows sufficient material at the bridge areas 62 (or 62') to avoid costly machining or casting procedures to fabricate the laminations 50 (or 50'), and enables the top conductive bars in the upper slot regions 58 to present a lower bar resistance at normal running speed. Moreover, undesirable reactance effects for the conductive bars 52 have been found to be diminished in accordance with the slot construction of the present invention.

Reference is made herein to "punched diameter", and "diameter" in the context of the outer diameter of a lamination. In this context, "punched diameter" means "as punched" by a punch press and does not contemplate finishing operations for establishing air gap defining finished surfaces. Thus, it should be understood that reference to, for example, a "plate diameter of about 150 mm." would be inclusive of an as punched lamination having a nominal as punched diameter of 150 mm., but also a lamination within a finished rotor having a nominal finished outer diameter somewhat less than 150 mm. (so that an appropriate air gap will be maintained between rotor and stator).

While the foregoing description represents preferred embodiments of the present invention, it will be obvious to those skilled in the art that various changes and modifications may be made, without departing from the true spirit and scope of the present invention.

What is claimed is:

1. A lamination for use in a lamination stack forming a rotor in a dynamo-electric machine, comprising:
    a flat circular plate of ferromagnetic material having a number of equally circumferentially spaced closed slots extending radially in a region near the outer periphery of said plate,
    said slots being formed to contain conducting members which extend axially along the rotor when like ones of said plates are stacked face-to-face with corresponding slots in communication with one another,
    each of said slots having an upper edge that is substantially in the shape of a V at an upper slot region adjacent the periphery of said plate and symmetrical about a radial center line, portions of said upper edge corresponding to legs of the V diverging from one another in the direction towards the center of said plate, and
    each upper edge portion corresponding to a leg of said V forms an angle of about 30 degrees with respect to a line drawn perpendicular to the radial center line of the slot;
    wherein said circular plate has bridge areas between said upper slot regions and the outer periphery of said plate, a center region of the upper edge of each slot is curved at a first radius between the edge portions corresponding to legs of said V to define a bridge area for each slot, and said slots are each formed to constrict toward the radial center line of the slot with opposing edges curved at a second radius between distal ends of the upper edge and a first set of points along which the opposing edges have a common tangent which is perpendicular to said radial center line;
    wherein the center region of the upper edge of each slot forms a narrowest part of each bridge area, and the radial dimension of said narrowest part is in the range from about 0.25 mm to about 0.4 mm.

2. A lamination according to claim 1, wherein opposing edges of said slots are curved continuously at a third radius to constrict toward said center line from said common tangent line and radially inward over an arc of 90 degrees to a second set of points defining tops of neck portions of said slots.

3. A lamination according to claim 2, wherein the tops of said neck portions are located at points radially of said plate such as to optimize electromagnetic performance.

4. A lamination according to claim 2, wherein said first radius is about 0.932 mm., said second radius is about 0.813 mm., and said third radius is about 0.7 mm.

5. A lamination according to claim 2, wherein said first radius is about 0.892 mm., said second radius is about 0.919 mm., and said third radius is about 0.76 mm.

6. A lamination according to claim 2, wherein said first radius is about 0.933 mm., said second radius is about 0.715 mm., and said third radius is about 0.76 mm.

7. A lamination according to claim 2, wherein said first radius is about 0.934 mm., said second radius is about 1.105 mm., and said third radius is about 0.762 mm.

8. A lamination according to claim 3, wherein said plate has a diameter of about 95 mm. and the tops of said neck portions are located at a radius of about 43.462 mm.

9. A lamination according to claim 3, wherein said plate has a diameter of about 122 mm. and the tops of said neck portions are located at a radius of about 56.9 mm.

10. A lamination according to claim 3, wherein said plate has a diameter of about 150 mm. and the tops of said neck portions are located at a radius of about 70 mm.

11. A dynamo-electric machine, comprising:
    a generally cylindrical casing;
    a stator fixed in said casing and comprised of a stack of plate laminations of ferromagnetic material, said stator having a cylindrical bore;
    a stator winding embedded in stator slots which extend radially outward from the circumference of said bore;
    a rotor comprised of a stack of rotor laminations of ferromagnetic material and supported by said casing in said bore for rotational movement about the bore axis, said rotor including conductive means for interacting with a magnetic field when said stator windings are energized by an outside electrical source;
    wherein each of the rotor laminations comprises:
    a flat circular plate of ferromagnetic material having a number of equally circumferentially spaced closed slots extending radially in a region near the outer periphery of said plate,
    said slots being formed to contain conducting members which extend axially along the rotor when like ones of said plates are stacked face-to-face with corresponding slots substantially aligned with one another, each of said slots having an upper edge that is substantially in the shape of a V at an upper slot region adjacent the periphery of said plate and symmetrical about a radial center line, portions of said upper edge corresponding to legs of the V diverging from one another in the direction towards the center of said plate, and each upper edge portion corresponding to a leg of said V forms an angle of about 30 degrees with respect to a line drawn perpendicular to the radial center line of the slot;

wherein said circular plate has bridge areas between said upper slot regions and the outer periphery of said plate, a center region of the upper edge of each slot is curved at a first radius between the edge portions corresponding to legs of said V to define a bridge area for each slot, and said slots are each formed to constrict toward the radial center line of the slot with opposing edges curved at a second radius between distal ends of the upper edge and a first set of points along which the opposing edges have a common tangent which is perpendicular to said radial center line;

wherein the center region of the upper periphery of each slot forms a narrowest part of each bridge area, and the radial dimension of said narrowest part is in the range from about 0.25 mm to about 0.4 mm.

12. A machine according to claim 11, wherein opposing edges of said slots are curved continuously at a third radius to constrict toward said center line from said common tangent and radially inward over an arc of 90 degrees to a second set of points defining tops of neck portions of said slots.

13. A machine according to claim 12, wherein the tops of said neck portions are located at points radially of said plate such as to optimize electromagnetic performance.

14. A machine according to claim 12, wherein said first radius is about 0.932 mm., said second radius is about 0.813 mm., and said third radius is about 0.7 mm.

15. A machine according to claim 12, wherein said first radius is about 0.892 mm., said second radius is about 0.919 mm., and said third radius is about 0.76 mm.

16. A machine according to claim 12, wherein said first radius is about 0.933 mm., said second radius is about 0.715 mm., and said third radius is about 0.76 mm.

17. A machine according to claim 12, wherein said first radius is about 0.934 mm., said second radius is about 1.105 mm., and said third radius is about 0.762 mm.

18. A machine according to claim 13, wherein said plate has a diameter of about 95 mm. and the tops of said neck portions are located at a radius of about 43.462 mm.

19. A machine according to claim 13, wherein said plate has a diameter of about 122 mm. and the tops of said neck portions are located at a radius of about 56.9 mm.

20. A machine according to claim 13, wherein said plate has a diameter of about 150 mm. and the tops of said neck portions are located at a radius of about 70 mm.

* * * * *